United States Patent [19]

Cooper

[11] Patent Number: 4,898,448
[45] Date of Patent: Feb. 6, 1990

[54] FIBER DISTRIBUTION PANEL

[75] Inventor: David A. Cooper, Loganton, Pa.

[73] Assignee: GTE Products Corporation, Stamford, Conn.

[21] Appl. No.: 188,940

[22] Filed: May 2, 1988

[51] Int. Cl.⁴ .......................... G02B 6/36; G02B 7/26
[52] U.S. Cl. ................................................. 350/96.20
[58] Field of Search ............... 350/96.20, 96.21, 96.22

[56] References Cited

U.S. PATENT DOCUMENTS

| | | | |
|---|---|---|---|
| 4,373,776 | 2/1983 | Purdy | 350/96.20 |
| 4,595,255 | 6/1986 | Bhatt et al. | 350/96.20 |
| 4,666,240 | 5/1987 | Caron et al. | 350/96.20 |
| 4,679,896 | 7/1987 | Krafcik et al. | 350/96.20 |
| 4,685,764 | 8/1987 | Hoffer et al. | 350/96.20 |
| 4,687,289 | 8/1987 | DeSanti | 350/96.20 |
| 4,818,054 | 4/1989 | George et al. | 350/96.20 |

*Primary Examiner*—William L. Sikes
*Assistant Examiner*—Robert E. Wise
*Attorney, Agent, or Firm*—William H. McNeill

[57] ABSTRACT

Apparatus for interfacing outside plant fiber optic cable with fiber optic testing, multiplexing and transmission equipment, including a stationary housing and moveable integrated connector panel, splice shelf and cable storage unit.

14 Claims, 3 Drawing Sheets

FIBER DISTRIBUTION PANEL

BACKGROUND OF THE INVENTION

1. Field of the Invention

The present invention relates to apparatus for interfacing optical fibers of external fiber optical cable with select optical fibers within equipment to which such optical fibers of such external fiber optical cable are to be coupled. The apparatus serves as an integrated connector panel, splice shelf and cable storage unit for interconnection between outside plant cable and fiber optic testing, multiplexing and transmission equipment.

2. Description of the Prior Art

In prior art fiber optical cable interfacing apparatus access to the housing in which optical fibers are spliced and coupled to the appropriate optical connectors is from the front and rear of the housing. To gain access, a covering panel is removed to expose the inside of the housing to the extent desired. Typically, one or more splice trays are contained in the housing. Since space in usually limited it is difficult, if possible at all, for a technician to perform various tasks within the apparatus such as splicing of optical fibers, repair of a splice, and the like. Therefore, in many applications the apparatus is designed such that removal of a covering panel allows the technician to remove the splice tray or the fibers from the tray to perform the task at hand. Usually any excess length of cable or fiber is stored in the tray, storage in this manner tending to cause undesirable attenuation and in some instances excessive kinking or bending of the optical fiber being stored. In such apparatus testing and service is difficult.

One attempt to overcome the problems associated with such prior art apparatus is described in U.S. Pat. No. 4,708,430 which relates to a cabinet for optical cable terminating equipment. Such cabinet includes a removable front cover, a stack of splice trays within, and an array of optical connectors mounted on a front panel. To gain access to the inside of the cabinet the front cover is removed. The front panel, which is hinged to the cabinet at one side of a front opening, is then pivoted relative to the front opening to expose the interior of the cabinet. In such apparatus, it is necessary to detach the stack of splice trays and move the stack forward in order for the trays to be readily accessible for repair, replacement or testing.

It is highly desirable to provide interfacing apparatus for equipment containing optical fibers which can be tested and serviced external of the apparatus but without uncoupling of the constituent components.

It is further desirable to provide interfacing apparatus for equipment containing optical fibers which can be tested and serviced from the front of the apparatus.

It is also desirable to provide interfacing apparatus for equipment containing optical fibers in which a stationary housing includes a moveable splice tray, cable storage unit and fiber optical connector panel wherein attenuation is not a problem and optical fiber bending is controlled.

It is further desirable to provide interfacing apparatus which can be mounted in standard equipment containing optical fiber.

It is further desirable to provide interfacing apparatus for equipment containing optical fibers which is compact and yet readily accessible.

It is also desirable to provide such equipment having improved fiber organization so that users can access specific fibers quickly and easily with less risk of breakage and improved productivity.

SUMMARY OF THE INVENTION

The invention achieves these and other results by providing apparatus for interfacing optical fibers of external fiber optical cable with select optical fibers within equipment to which such optical fibers of such external fiber optical cable are to be coupled. The apparatus includes a housing comprising a base, first and second opposing side walls extending vertically from the base, a rear access panel extending vertically from the base and extending from the first opposing side wall to the second opposing side wall, a forward opening opposite the rear access panel, and means associated with the first and second side walls for slideably supporting a drawer within the housing so that the drawer can be slid relative to the rear access panel into the housing and out of the housing at the forward opening. The rear access panel includes at least one opening through which one or more flexible fiber tubing extends through each of which one or more of the external optical fibers can extend from outside of the housing to the inside of the housing. One end of each flexible fiber tubing is coupled to the rear access panel at the opening and an opposite end of each flexible fiber tubing extends into the housing. A drawer is provided for sliding upon the slideably supporting means, the drawer forming an enclosure including a bottom, first and second opposing side panels extending vertically from the bottom, a rear wall extending vertically from the bottom and extending from the first opposing side panel to the second opposing side panel, and a forward mounting panel opposite the rear wall and extending vertically from the bottom and extending from the first opposing side wall to the second opposing side wall. The forward mounting panel includes a plurality of optical fiber connectors. The enclosure includes an optical fiber splice cradle. The bottom of the drawer is spaced from the base of the housing so that the flexible fiber tubing can extend into a cavity formed between the drawer and the base when the drawer is slid into the housing. The drawer includes an access opening through which the optical fibers of the external fiber optical cables can extend to the splice cradle. The enclosure further includes an optical fiber storage unit.

DESCRIPTION OF THE PREFERRED EMBODIMENT

Figure 1:
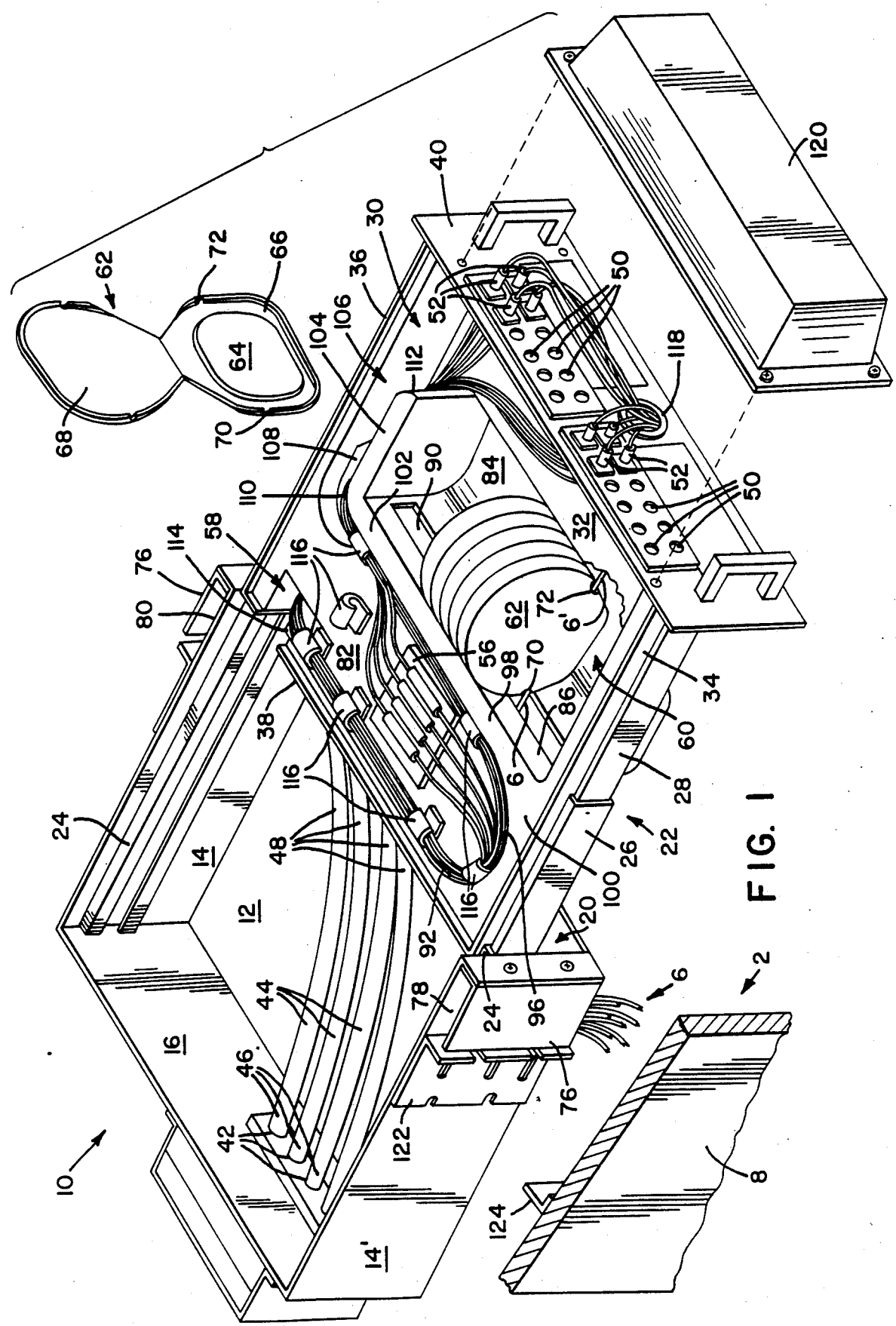
FIG. 1 is a perspective view of one embodiment of the present invention showing the drawer of the present invention in an open position.

The embodiment of this invention which is illustrated in the drawings is particularly suited for achieving the objects of this invention. The drawings depict an apparatus for interfacing optical fibers 4 of an external fiber optical cable 4' with select optical fibers 6 within equipment 8 to which such optical fibers 4 are to be coupled. The apparatus includes a housing 10 comprising a base 12, and first side wall 14 and opposing second side wall 14' each extending vertically from the base 12. A rear access panel 16 is provided extending vertically from base 12 and extending from the first opposing side wall 14 to the second opposing side wall 14'. A forward opening 20 is opposite the rear access panel 16. Means are associated with the first and second side walls 14, 14' for slideably supporting a drawer 22 within the housing 10 so that the drawer 22 can be slid relative to the rear access panel 16 into the housing 10 at the forward opening 20. For example, rails 24 are attached to first and second side walls 14, 14' to form tracks upon which the drawer 22 can be caused to slide by means of corresponding telescopic members 26, 28 provided on both sides of the drawer 22. The specific drawer sliding mechanism chosen can be any known in the art and forms no part of the present invention.

Drawer 22 forms an enclosure 30 which includes a bottom 32, and a first side panel 34 and an opposing second side panel 36 each extending vertically from the bottom 32. A rear wall 38 extends vertically from the bottom 32 and extends from first side panel 34 to the second side panel 36. A forward mounting panel 40 opposite rear wall 38 extends vertically from the bottom 32 and extends from the first side wall 34 to the second side wall 36.

The rear access panel 16 includes at least one opening through which one or more flexible fiber tubing extends. For example, rear access panel 16 is depicted as including four openings 42 through each of which a flexible fiber tubing 44 extends. One or more of the optical fibers 4 of the external fiber optical cables are shown (FIG. 3) extending through respective flexible fiber tubing 44 from outside of the housing 10 to the inside of the housing 10. One end 46 of each flexible fiber tubing 44 is coupled to the rear access panel 16 at a respective opening 42 and an opposite end 48 of each flexible fiber tubing 44 extends into the housing 10 as depicted in the drawings. The external fiber optical cables 4' and/or optical fibers 4 can be fastened (not shown) to the outside surface of the rear access panel 10 in a known manner to provide strain relief to prevent problems such as fiber damage or undesirable attenuation.

The forward mounting panel 40 includes a plurality of openings 50 extending therethrough. Optical fiber connectors 52 of the type known in the art are fastened to the forward mounting panel 40 and extend through respective openings 50 to provide access from outside of the apparatus to the internal portion thereof as described further herein.

Figure 2:
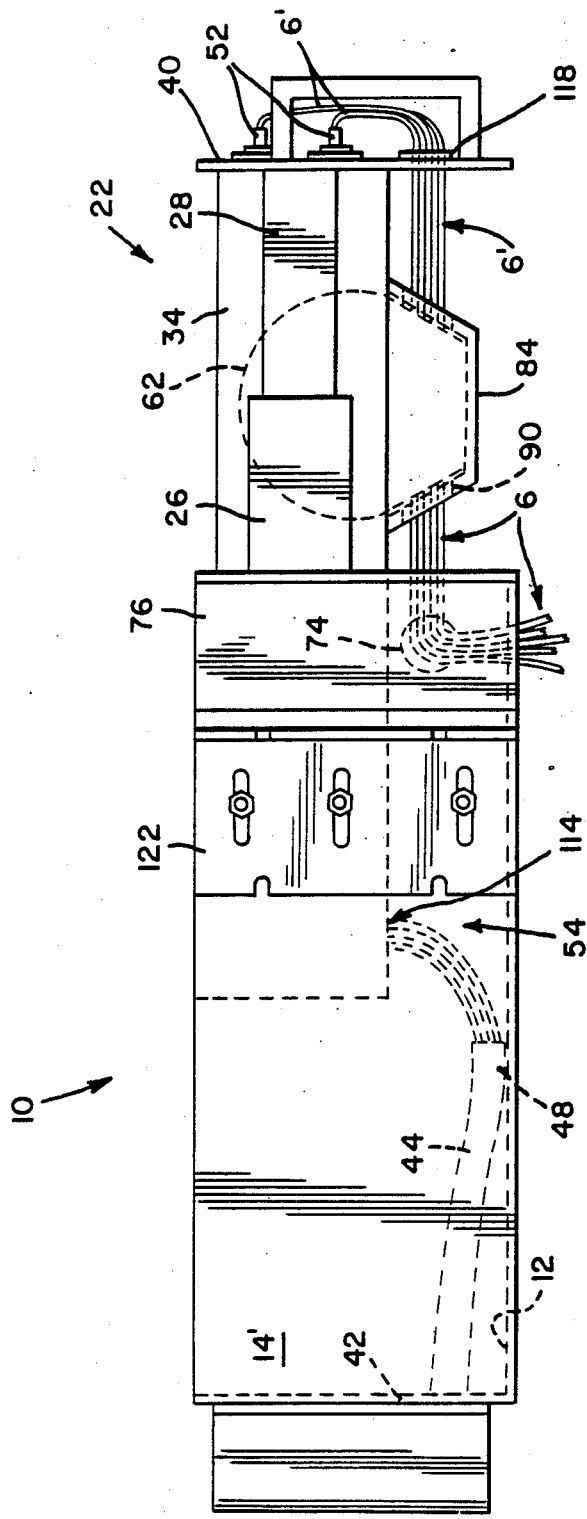
FIG. 2 is an elevational view of the embodiment of FIG. 1 showing the drawer partially closed.

The bottom 12 of the housing 10 is spaced from the base 32 of the drawer 22 so that one or more flexible fiber tubings 44 can extend into a cavity 54 formed between the drawer 22 and the housing 10, when the drawer is slid into the housing. For example, FIG. 2 depicts the drawer 22 partially closed, the flexible fiber tubing 44 extending in cavity 54.

Enclosure 30 includes one or more optical fiber splice cradle 56 for splicing fibers as further described herein. Optical fiber splice cradle 56 can be of the type providing a fusion or mechanical splice as known in the art and forms no part of the present invention. The drawer 22 includes an access opening 58 through which one or more of the optical fibers 4 of the external fiber optical cables can extend to the splice cradle 56, as depicted in FIG. 1.

Enclosure 30 also includes an optical fiber storage unit 60. In the preferred embodiment such storage unit 60 is adapted to receive a plurality of optical fiber storage cassettes 62 each having a reel 64 mounted within a reel housing 66 enclosed by a pivotally mounted lid 68 and including a fiber opening 70 and fiber opening 72 as depicted in FIG. 1. Such cassettes are utilized to store fiber in the apparatus as described herein.

The apparatus also includes means associated with the housing 10 for protecting the select optical fibers 6 of equipment 8 and for accessing the cavity 54 to such select optical fibers 6. For example, the protecting and accessing means is depicted in FIG. 2 as including at least one aperture 74 extending through at least one of the first and second opposing side walls 14, 14'. At least one corresponding fiber guard 76 is attached to a respective wall 14, 14' adjacent a respective aperture 74 on a surface 78, 80 of first and second side walls 14, 14', respectively, exterior of cavity 54.

In the preferred embodiment the enclosure 30 is divided into a first enclosed portion 82 and a second enclosed portion 84 separated by a dividing wall 86 extending vertically from the bottom 32 and from the first side panel 34 towards the second side panel 36 but being spaced from such second side panel. Splice cradle 56 is positioned in the first enclosed portion 82 and the storage unit 60 is positioned in the second enclosed portion 84. Dividing wall 86 includes a jumper exit slot 90 which accesses the second enclosed portion 84 to the cavity 54.

The first enclosed portion 82 includes a vertical boundary 92, the vertical boundary 92 being contoured at 96 to identify or form an optical fiber path of a predetermined fiber bend radius. Preferably, the dividing wall 86 includes a first leg 98 extending from the first side panel 34 towards the second side panel 36 including one end 100 adjacent the first side panel and an opposite end 102, and a second leg 104 extending from end 102 towards the forward mounting panel 40. In FIG. 1, the second leg 104 is spaced from the second side panel 36 to form an optical fiber channel 106 having a floor 108. The opposite ends 110, 112 of second leg 104 and the floor 108 are contoured to identify or form a predetermined bend radius. Preferably, the access opening 58 includes an access opening base 114 also contoured to a predetermined bend radius. Means are provided associated with the vertical boundary 92 and dividing wall 86 for holding optical fibers in place relative to the vertical boundary and dividing wall so that the optical fibers conform to the predetermined bend radius. To this end clips 116 can be provided. By conforming the optical fibers to the various bend radii, the degree of fiber bend is controlled to prevent undesirable attenuation and fiber damage.

The forward mounting panel 40 includes a routing opening 118 extending therethrough, the routing opening 118 providing access to the enclosure 30. The front of the forward mounting panel 40 can be protected by providing a front cover 120 which is removably coupled to the forward mounting panel in a known manner.

Figure 3:
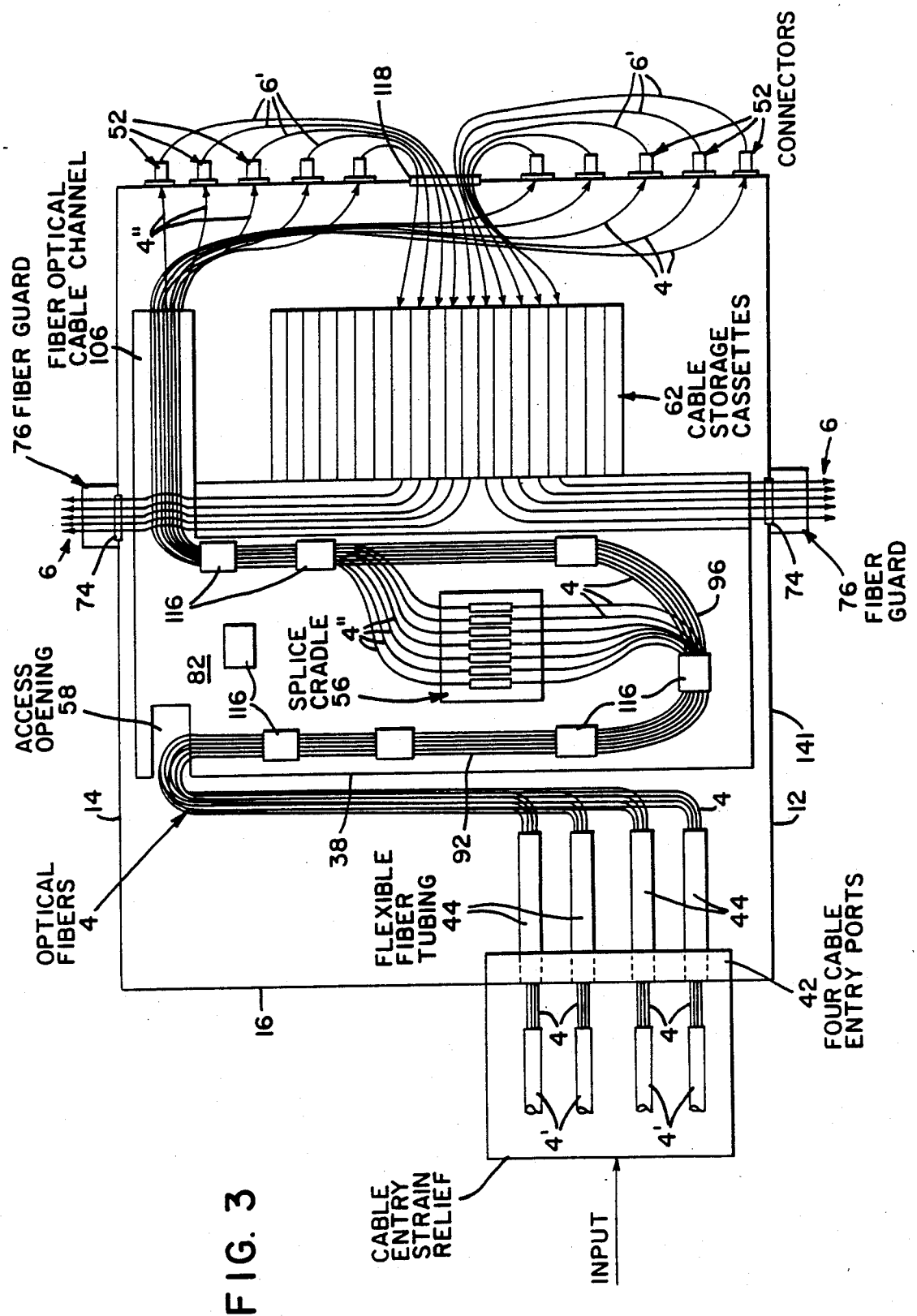
FIG. 3 is a schematic view of the embodiment of FIGS. 1 and 2 depicting the orientation of the optical fibers.

Referring to FIGS. 1 and 3, the apparatus 2 can be mounted to equipment rack 8 by means of apparatus mounting brackets 122 and corresponding equipment mounting brackets 124. External fiber optical cable 4' including optical fibers 4 is fastened to the outside surface of rear access panel 16 in a known manner (not shown) in the vicinity of a respective opening 42, and respective individual optical fibers 4 are fed through a corresponding flexible fiber tubing 44. Such fibers 4 exit from flexible fiber tubing 44 and extend through access opening 58 along access opening base 114 at the predetermined bend radius of base 114. Fibers 4 next extend along the fiber path formed by the vertical boundary 92, which is contoured at 96 to identify a predetermined bend radius, fibers 4 being held in place by end clips 116. Some of the fibers 4 extend to splice cradle 56 and are spliced in a known manner to corresponding pigtail optical fibers 4″. Pigtail fibers 4″, and those fibers 4 not extending to splice cradle 56, extend along the dividing wall 86, adjacent first leg 98 and adjacent second leg 104 and floor 108 of channel 106, following the contours of opposite ends 110, 112 of second leg 104, and of floor 108, as desired, which contours each form a predetermined bend radius. Such fibers 4 and 4″ emerge from channel 106 and extend to optical fiber connectors 52 to which fibers 4 and 4″ are connected in a known manner. Optical fibers 6′ are connected to the opposite side of select optical fiber connectors 52 in a known manner from which fibers 6′ extend back into the enclosure 30 through the routing opening 118. From opening 118, select fibers 6′ extend into select storage cassettes 62 thru aperture 72. The fibers are wrapped around a respective reel 64 and exit cassette 62 thru aperture 70. Select fibers 6′ enter cavity 54 by means of slot 90. From cavity 54 fibers 6′ exit wall 14 or 14′ thru aperture 74 and protected by fiber guard 76.

The many advantages of the apparatus of the present invention include, without limitation, providing a convenient point of interconnection between outside plant cable and equipment for such uses as fiber optic testing, multiplexing and transmission. To this end a compact integrated connector panel and splice cradle is provided which slides out from the front of a stationary housing for full accessibility and adequate working space during testing and servicing. The controlled fiber organization and storage for fiber and pigtail slack allows for quick and easy access to specific fibers with less risk of breakage and improved productivity. The unit provides for accommodating a plurality of outside plant cables and correspondingly a plurality of mechanical or fusion splices wherein attenuation is not a problem and optical fiber bending is controlled. Such interfacing equipment is designed to be mounted in standard equipment containing optical fibers.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

We claim:

1. Apparatus for interfacing optical fibers of external fiber optical cable with select optical fibers within equipment to which such optical fibers of such external fiber optical cable are to be coupled, comprising:

a housing comprising a base, first and second opposing side walls extending vertically from said base, a rear access panel extending vertically from said base and extending from said first opposing side wall to said second opposing side wall, a forward opening opposite said rear access panel, and means associated with said first and second side walls for slideably supporting a drawer within said housing so that said drawer can be slid relative to said rear access panel into said housing and out of said housing at said forward opening, said rear access panel including at least one opening through which one or more flexible fiber tubing extends through each of which one or more optical fibers can extend from outside of said housing to the inside of said housing, one end of each flexible fiber tubing being coupled to said rear access panel at said at least one opening and an opposite end of each flexible fiber tubing extending into said housing; and, a drawer for so sliding upon said slideably supporting means, said drawer forming an enclosure including a bottom, first and second opposing side panels extending vertically from said bottom, a rear wall extending vertically from said bottom and extending from said first opposing side panel to said second opposing side panel, and a forward mounting panel opposite said rear wall and extending vertically from said bottom and extending from said first opposing side wall to said second opposing side wall, said forward mounting panel including a plurality of optical fiber connectors, said enclosure including an optical fiber splice cradle, said bottom being spaced from said base so that said one or more flexible fiber tubing can extend into a cavity formed between said drawer and said base when said drawer is slid into said housing, said drawer including an access opening through which optical fibers of said one or more of said external fiber optical cables can extend to said splice cradle, said enclosure further including a fiber optical cable storage unit.

2. The apparatus of claim 1 wherein said optical connectors access said enclosure and further including a routing opening extending through said forward mounting panel, said routing opening also accessing said enclosure.

3. The apparatus of claim 2 further including means associated with said housing for protecting said select optical fibers of said equipment and for accessing said cavity to said select optical fibers.

4. The apparatus of claim 3 wherein said protecting and accessing means includes at least one aperture extending through at least one of said first and second opposing side walls and at least one corresponding fiber guard adjacent said at least one aperture on a surface of said at least one of said first and second opposing side walls which is exterior of said cavity.

5. The apparatus of claim 2 wherein said enclosure is divided into a first enclosed portion and a second enclosed portion separated from said first enclosed portion by a dividing wall extending vertically from said bottom and extending from said first opposing side panel towards said second opposing side panel but being spaced from said second opposing side panel, said splice cradle being positioned in said first enclosed portion and said storage unit being positioned in said second enclosed portion.

6. The apparatus of claim 5 wherein said dividing wall includes a jumper exit slot accessing said cavity.

7. The apparatus of claim 6 wherein said first enclosed portion includes a vertical boundary, said vertical boundary and said dividing wall being contoured to identify optical fiber paths of at least one predetermined fiber bend radius, and further including means associated with said vertical boundary and said dividing wall for holding said optical fibers in place relative to said vertical boundary and said dividing wall.

8. The apparatus of claim 7 wherein said storage unit includes a plurality of optical fiber storage cassettes.

9. The apparatus of claim 8 further including means associated with said housing for protecting said select optical fibers of said equipment and for accessing said cavity to said select optical fibers.

10. The apparatus of claim 9 wherein said protecting and accessing means includes at least one aperture extending through at least one of said first and second opposing side walls and at least one corresponding fiber guard adjacent said at least one aperture on a surface of said at least one of said first and second opposing side walls which is exterior of said cavity.

11. The apparatus of claim 10 further including a front cover which is removably coupled to said forward mounting panel.

12. The apparatus of claim 7 wherein said dividing wall includes a first leg extending from said first side panel towards said second side panel including one end adjacent said first side panel and an opposite end, and a second leg extending from said opposite end towards said forward mounting panel.

13. The apparatus of claim 12 wherein said second leg is spaced from said second side panel to form an optical fiber channel, said channel having a floor, said second leg having opposite ends, and said opposite ends and said floor being contoured to said at least one predetermined bend radius.

14. The apparatus of claim 13 wherein said access opening includes an access opening base contoured to said at least one predetermined bend radius.

* * * * *

UNITED STATES PATENT AND TRADEMARK OFFICE
CERTIFICATE OF CORRECTION

PATENT NO.  : 4,898,448

DATED       : February 6, 1990

INVENTOR(S) : David A. Cooper, Robert W. Barlow

It is certified that error appears in the above-identified patent and that said Letters Patent is hereby corrected as shown below:

On the title page, Item [75] Inventor:   David A. Cooper, Loganton, PA should be Inventors:   David A. Cooper, Loganton, PA Robert W. Barlow, Canton, PA Signed and Sealed this Thirteenth Day of October, 1992

*Attest:*

DOUGLAS B. COMER

*Attesting Officer*                               *Acting Commissioner of Patents and Trademarks*